(12) United States Patent
Damme

(10) Patent No.: US 6,408,798 B1
(45) Date of Patent: Jun. 25, 2002

(54) TANGLE RESISTANCE PET TIE DEVICE

(76) Inventor: Larry Van Damme, 153 Landon Ave., Newark, NY (US) 14513

( * ) Notice: Subject to any disclaimer, the term of this patent is extended or adjusted under 35 U.S.C. 154(b) by 0 days.

(21) Appl. No.: 09/775,438

(22) Filed: Feb. 2, 2001

(51) Int. Cl.[7] .............................................. A01K 3/00
(52) U.S. Cl. ...................................... 119/787; 119/788
(58) Field of Search ................................. 119/769, 770, 119/771, 772, 774, 786, 787, 788; 135/118

(56) References Cited

U.S. PATENT DOCUMENTS

| | | | |
|---|---|---|---|
| 4,546,730 A | * 10/1985 | Holland | 119/61 |
| 4,998,507 A | 3/1991 | Browning | |
| 5,003,929 A | 4/1991 | Dean | |
| 5,031,577 A | 7/1991 | Flugger | |
| 5,224,443 A | * 7/1993 | Leslie | 119/447 |
| D341,232 S | 11/1993 | Dethloff, Jr. | |
| 5,437,246 A | * 8/1995 | Noles | 119/785 |
| 5,443,038 A | 8/1995 | Marino | |
| 5,462,019 A | 10/1995 | Hong-Rong et al. | |
| 5,785,007 A | * 7/1998 | Sauber et al. | 119/771 |
| 5,870,974 A | * 2/1999 | Johnson | 119/786 |

\* cited by examiner

Primary Examiner—Yvonne R. Abbott

(57) ABSTRACT

A tangle resistance pet tie device for tying a pet to a vertical implement such that the tether holding the pet moves freely about the vertical implement. The tangle resistance pet tie device includes an annular member having an inner surface, an outer surface, a top surface and a bottom surface. The annular member has a pair of oppositely positioned breaks therein. The first and second portions are removably couplable to each other. A clamp for positioning on the annular member comprises a ring having a break therein. The clamp is movable about the annular member. A band is securely attached to an outer surface of the clamp and extends in an opposite direction of the break in the clamp. Each of a plurality of protruding members is securely coupled to an inner surface of the annular member such that a free end of each of the protruding members radially extends toward an axis of the annular member. Each of the free ends has a bore extending therein. Each of the protruding members is movable through the break in the clamp. Each of a plurality of elongated rods has a first end and a second end. Each of the first ends of the rods is movably extendable in one of the bores. The annular member is positioned around the vertical implement and the elongated rods extended to abut the vertical implement.

5 Claims, 3 Drawing Sheets

TANGLE RESISTANCE PET TIE DEVICE

BACKGROUND OF THE INVENTION

1. Field of the Invention

The present invention relates to pet tie devices and more particularly pertains to a new tangle resistance pet tie device for tying a pet to a vertical implement such that the tether holding the pet moves freely about the vertical implement.

2. Description of the Prior Art

The use of pet tie devices is known in the prior art. More specifically, pet tie devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,003,929; 5,031,577; 5,462,019; 4,998,507; U.S. Des. Pat. No. 341,232; and U.S. Pat. No. 5,443,038.

While these devices fulfill their respective, particular objectives and requirements, the aforementioned patents do not disclose a new tangle resistance pet tie device. The inventive device includes an annular member having an inner surface, an outer surface, a top surface and a bottom surface. The annular member has a pair of oppositely positioned breaks therein. The first and second portions are removably couplable to each other. A clamp for positioning on the annular member comprises a ring having a break therein. The clamp is movable about the annular member. A band is securely attached to an outer surface of the clamp and extends in an opposite direction of the break in the clamp. Each of a plurality of protruding members is securely coupled to an inner surface of the annular member such that a free end of each of the protruding members radially extends toward an axis of the annular member. Each of the free ends has a bore extending therein. Each of the protruding members is movable through the break in the clamp. Each of a plurality of elongated rods has a first end and a second end. Each of the first ends of the rods is movably extendable in one of the bores. The annular member is positioned around the vertical implement and the elongated rods extended to abut the vertical implement.

In these respects, the tangle resistance pet tie device according to the present invention substantially departs from the conventional concepts and designs of the prior art, and in so doing provides an apparatus primarily developed for the purpose of tying a pet to a vertical implement such that the tether holding the pet moves freely about the vertical implement.

SUMMARY OF THE INVENTION

In view of the foregoing disadvantages inherent in the known types of pet tie devices now present in the prior art, the present invention provides a new tangle resistance pet tie device construction wherein the same can be utilized for tying a pet to a vertical implement such that the tether holding the pet moves freely about the vertical implement.

The general purpose of the present invention, which will be described subsequently in greater detail, is to provide a new tangle resistance pet tie device apparatus and method which has many of the advantages of the pet tie devices mentioned heretofore and many novel features that result in a new tangle resistance pet tie device which is not anticipated, rendered obvious, suggested, or even implied by any of the prior art pet tie devices, either alone or in any combination thereof.

To attain this, the present invention generally comprises an annular member having an inner surface, an outer surface, a top surface and a bottom surface. The annular member has a pair of oppositely positioned breaks therein. The first and second portions are removably couplable to each other. A clamp for positioning on the annular member comprises a ring having a break therein. The clamp is movable about the annular member. A band is securely attached to an outer surface of the clamp and extends in an opposite direction of the break in the clamp. Each of a plurality of protruding members is securely coupled to an inner surface of the annular member such that a free end of each of the protruding members radially extends toward an axis of the annular member. Each of the free ends has a bore extending therein. Each of the protruding members is movable through the break in the clamp. Each of a plurality of elongated rods has a first end and a second end. Each of the first ends of the rods is movably extendable in one of the bores. The annular member is positioned around the vertical implement and the elongated rods extended to abut the vertical implement.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tangle resistance pet tie device apparatus and method which has many of the advantages of the pet tie devices mentioned heretofore and many novel features that result in a new tangle resistance pet tie device which is not anticipated, rendered obvious, suggested, or even implied by any of the prior art pet tie devices, either alone or in any combination thereof.

It is another object of the present invention to provide a new tangle resistance pet tie device which may be easily and efficiently manufactured and marketed.

It is a further object of the present invention to provide a new tangle resistance pet tie device which is of a durable and reliable construction.

An even further object of the present invention is to provide a new tangle resistance pet tie device which is susceptible of a low cost of manufacture with regard to both materials and labor, and which accordingly is then susceptible of low prices of sale to the consuming public, thereby making such tangle resistance pet tie device economically available to the buying public.

Still yet another object of the present invention is to provide a new tangle resistance pet tie device which provides in the apparatuses and methods of the prior art some of the advantages thereof, while simultaneously overcoming some of the disadvantages normally associated therewith.

Still another object of the present invention is to provide a new tangle resistance pet tie device for tying a pet to a vertical implement such that the tether holding the pet moves freely about the vertical implement.

Yet another object of the present invention is to provide a new tangle resistance pet tie device which includes an annular member having an inner surface, an outer surface, a top surface and a bottom surface. The annular member has a pair of oppositely positioned breaks therein. The first and second portions are removably couplable to each other. A clamp for positioning on the annular member comprises a ring having a break therein. The clamp is movable about the annular member. A band is securely attached to an outer surface of the clamp and extends in an opposite direction of the break in the clamp. Each of a plurality of protruding members is securely coupled to an inner surface of the annular member such that a free end of each of the protruding members radially extends toward an axis of the annular member. Each of the free ends has a bore extending therein. Each of the protruding members is movable through the break in the clamp. Each of a plurality of elongated rods has a first end and a second end. Each of the first ends of the rods is movably extendable in one of the bores. The annular member is positioned around the vertical implement and the elongated rods extended to abut the vertical implement.

Still yet another object of the present invention is to provide a new tangle resistance pet tie device that has protruding members and rods thereon for coupling to a vertical implement without damaging the vertical implement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
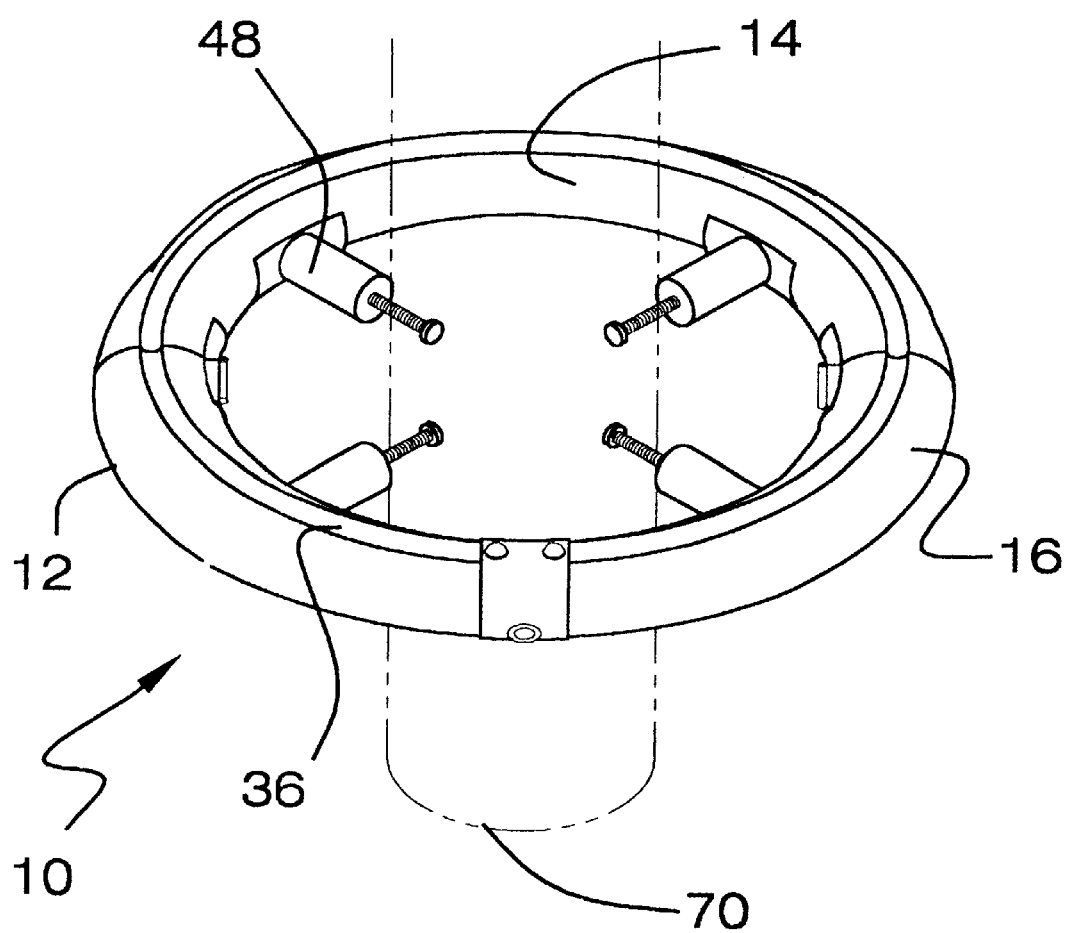
FIG. 1 is a schematic perspective view of a new tangle resistance pet tie device according to the present invention.
Figure 2:
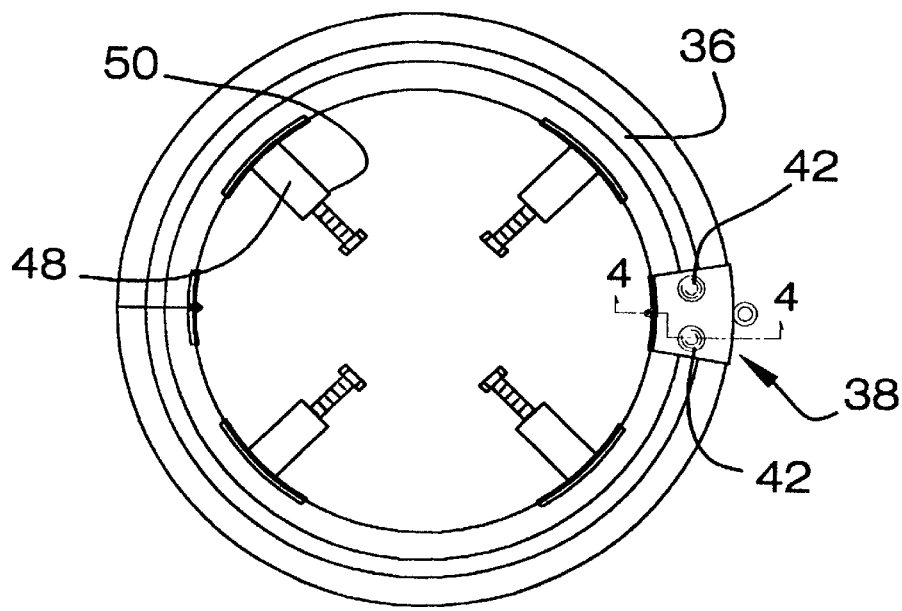
FIG. 2 is a schematic plan view of the present invention.
Figure 3:
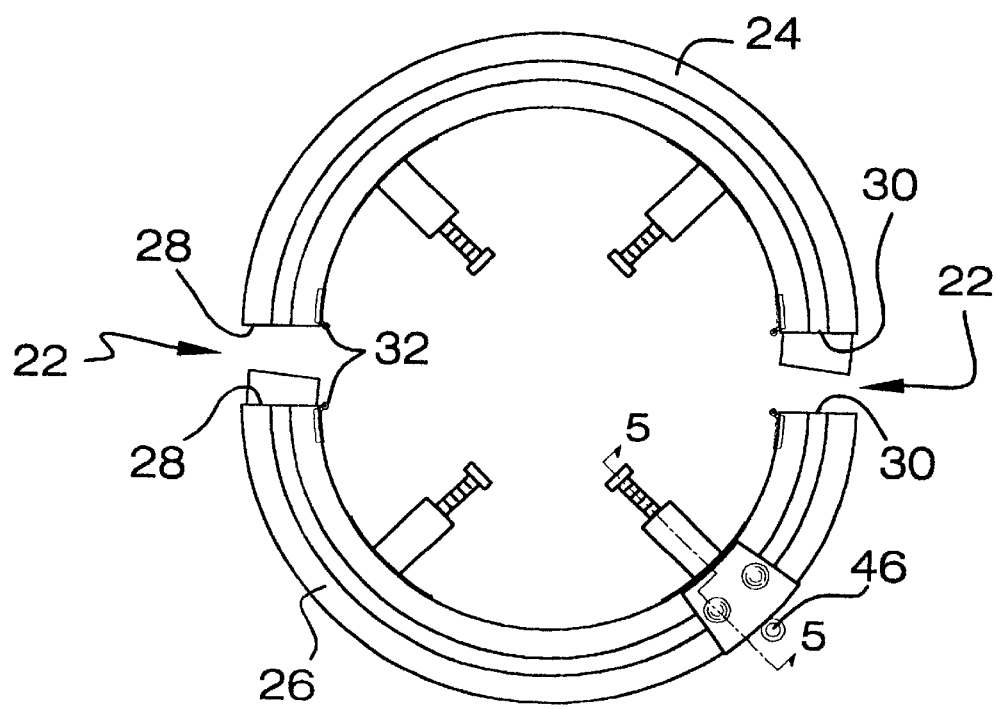
FIG. 3 is a schematic plan view of the present invention.
Figure 4:
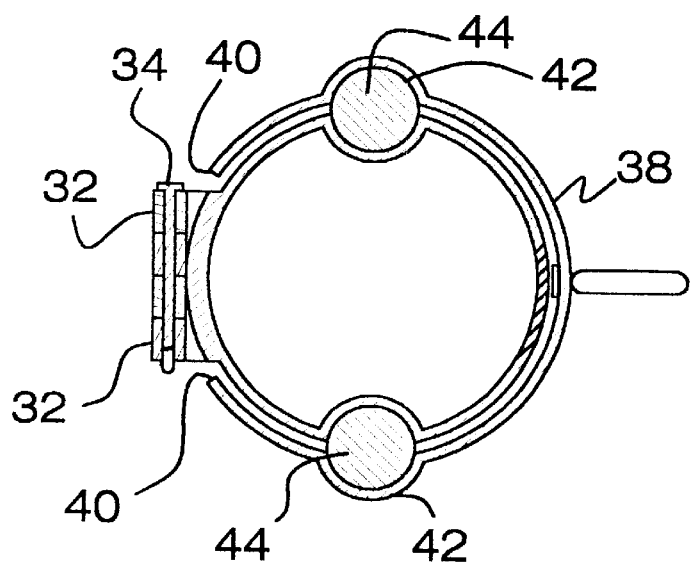
FIG. 4 is a schematic cross-sectional view taken along line 4—4 of the present invention.
Figure 5:
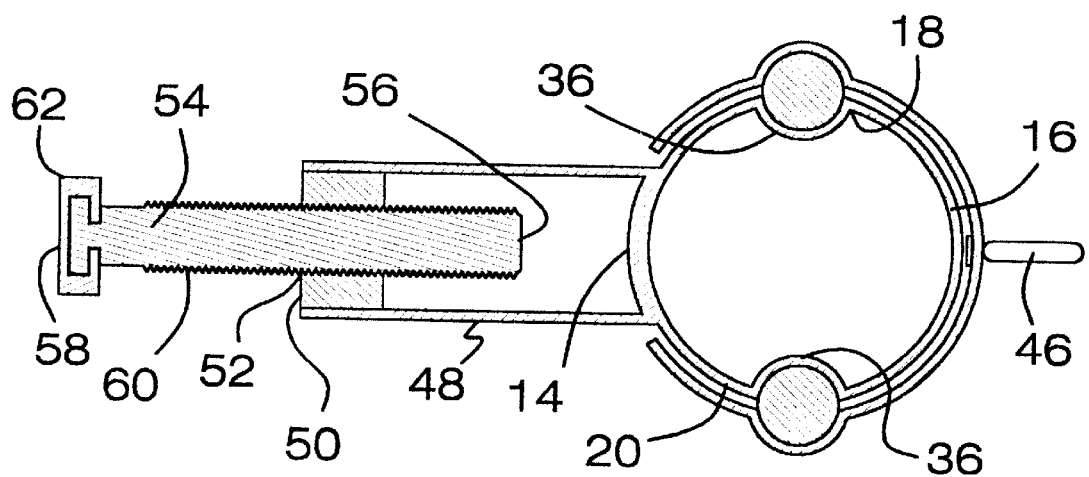
FIG. 5 is a schematic cross-sectional view taken along line 5—5 of the present invention.

With reference now to the drawings, and in particular to FIGS. 1 through 5 thereof, a new tangle resistance pet tie device embodying the principles and concepts of the present invention and generally designated by the reference numeral 10 will be described.

As best illustrated in FIGS. 1 through 5, the tangle resistance pet tie device 10 generally comprises an annular member 12 having an inner surface 14, an outer surface 16, a top surface 18 and a bottom surface 20. The annular member 12 has a pair of oppositely positioned breaks 22 therein such that a first portion 24 and a second portion 26 of the annular member 12 are defined. Each of the first 24 and second 26 portions has a first end 28 and a second end 30. Each of the first 24 and second 26 portions has a plurality of cylinders 32 coupled thereto and positioned generally adjacent to one of the first 28 and second 30 ends. The cylinders 32 on the first portion 24 are interspaced with the cylinders 32 on the second portion 26 when the ends 28, 30 on the first 24 and second 26 portions are abutted such that the cylinders 32 on the first portion 24 are coaxial with the cylinders 32 on the second portion 26. Each one of a pair of pins 34 is positionable in the cylinders 32 such that the first 24 and second 26 portions are removably coupled together. The top surface 18 has a groove 36 therein extending around the top surface 18. The bottom surface 20 has a groove 36 therein extending around the bottom surface 20.

A clamp 38 for positioning on the annular member comprises a ring having a break 40 therein. The ring, or clamp 38, has an inner surface having four concave depressions 42 therein. Each of the depressions 42 is positioned such that each of the grooves 36 is aligned with two of the depressions 42 when the clamp 38 is positioned on the annular member 12. Each of a plurality of ball bearings 44 is positioned in one of the depressions 42. The clamp 38 is movable about the annular member 12.

A band 46 is securely attached to an outer surface of the clamp 38 and extends in an opposite direction of the break 40 in the clamp 38. The band 46 may be used to fasten a tether thereto for coupling a pet to a vertical implement 70.

A plurality of protruding members 48 is securely coupled to an inner surface 14 of the annular member 12 such that a free end 50 of each of the protruding members 48 radially extends toward an axis of the annular member 12. Each of the free ends 50 has a bore 52 extending therein. Each of the bores 52 has an inner threaded surface. The protruding members 48 are movable through the break 40 in the clamp 38.

Each of a plurality of elongated rods 54 has a first end 56 and a second end 58. The rods 54 each have a threaded peripheral surface 60. Each of the first ends 56 of the rods 54 is movably extendable in one of the bores 52 and is threadably coupled to the inner surface of the associated bore 52. The second ends 58 each have a plate 62 coupled thereto.

In use, the annular member 12 is positioned around the vertical implement 70 and the elongated rods 54 are extended to abut the vertical implement 70. The annular member 12 secures the tether to the vertical implement 70, such as a tree, while allowing the clamp 38 to move about the annular member 12 so that the tether does not wrap about the vertical implement 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tangle resistant pet tie apparatus for removably coupling to a vertical implement, said apparatus comprising:
   an annular member having an inner surface, an outer surface, a top surface and a bottom surface, said annular member having a pair of oppositely positioned breaks therein, such that a first portion and second portion of said annular member are defined said first and second portions being removably couplable to each other;
   a clamp for positioning on said annular member, said clamp comprising a ring having a break therein, wherein said clamp is movable about said annular member;
   a band being securely attached to an outer surface of said clamp and extending in an opposite direction of said break in said clamp;
   a plurality of protruding members being securely coupled to the inner surface of said annular member such that a free end of each of said protruding members radially extends toward an axis of said annular member, each of said free ends having a bore extending therein, each of said protruding members being movable through said break in said clamp;
   a plurality of elongated rods having a first end and a second end, each of said first ends of said rods being movably extendable in one of said bores; and
   wherein said annular member is positionable around said vertical implement and said elongated rods extended to abut said vertical implement.

2. The tangle resistant pet tie apparatus as in claim 1, wherein said first and second portions of said annular member are defined, each of said first and second portions having a first end and a second end, each of said first and second portions having a plurality of cylinders coupled thereto and positioned generally adjacent to one of said first and second ends, wherein said cylinders on said first portion are interspaced with said cylinders on said second portion when said ends on said first and second portions are abutted such that said cylinders on said first portion are coaxial with said cylinders on said second portion, each one of a pair of pins being positionable in said cylinders such that said first and second portions are removably coupled together.

3. The tangle resistant pet tie apparatus as in claim 1, wherein said apparatus further includes:
   said top surface of said annular member having a groove therein extending around said top surface, said bottom surface having a groove therein extending around said bottom surface; and
   said clamp having an inner surface having four concave depressions therein, each of said depressions being positioned such that each of said grooves is aligned with two of said depressions when said clamp is positioned on said annular member, each of a plurality of ball bearings being positioned in one of said depressions.

4. The tangle resistant pet tie apparatus as in claim 3, wherein each of said bores having an inner threaded surface,
   each of said first ends of said rods being movably extended in one of said bores and being threadably coupled to said inner surface of the associated bore.

5. A tangle resistant pet tie apparatus for removably coupling to a tree, said apparatus comprising:
   an annular member having an inner surface, an outer surface, a top surface and a bottom surface, said annular member having a pair of oppositely positioned breaks therein such that a first portion and a second portion of said annular member are defined, each of said first and second portions having a first end and a second end, each of said first and second portions having a plurality of cylinders coupled thereto and positioned generally adjacent to one of said first and second ends, wherein said cylinders on said first portion are interspaced with said cylinders on said second portion when said ends on said first and second portions are abutted such that said cylinders on said first portion are coaxial with said cylinders on said second portion, each one of a pair of pins being positionable in said cylinders such that said first and second portions are removably coupled together, said top surface having a groove therein extending around said top surface, said bottom surface having a groove therein extending around said bottom surface;
   a clamp for positioning on said annular member, said clamp comprising a ring having a break therein, said ring having an inner surface having four concave depressions therein, each of said depressions being positioned such that each of said grooves is aligned with two of said depressions when said clamp is positioned on said annular member, each of a plurality of ball bearings being positioned in one of said depressions, wherein said clamp is movable about said annular member;
   a band being securely attached to an outer surface of said clamp and extending in an opposite direction of said break in said clamp;
   a plurality of protruding members being securely coupled to the inner surface of said annular member such that a free end of each of said protruding members radially extends toward an axis of said annular member, each of said free ends having a bore extending therein, each of said bores having an inner threaded surface, each of said protruding members being movable through said clamp;
   a plurality of elongated rods having a first end and a second end, each of said rods having a threaded peripheral surface, each of said first ends of said rods being movably extendable in one of said bores and being threadably coupled to said inner surface of the associated bore, each of said second ends having a plate coupled thereto;
   wherein said annular member is positionable around said vertical implement and said elongated rods extended to abut said vertical implement.

* * * * *